United States Patent [19]
Moline

[11] 3,788,030
[45] Jan. 29, 1974

[54] PIZZA PROCESSING MACHINE
[75] Inventor: Roy Virgil Moline, Duluth, Minn.
[73] Assignee: Jeno's, Inc., Duluth, Minn.
[22] Filed: Apr. 12, 1972
[21] Appl. No.: 243,320

[52] U.S. Cl. ................................. 53/123, 83/620
[51] Int. Cl. ............................................ B65b 5/08
[58] Field of Search ..................... 53/123; 83/620 X

[56] References Cited
UNITED STATES PATENTS
2,092,786   9/1937   Taylor .............................. 53/123 X
3,427,783   2/1969   Reid ..................................... 53/123

*Primary Examiner*—Travis S. McGehee
*Attorney, Agent, or Firm*—Hume, Clement, Brinks, Willian, Olds & Cook, Ltd.

[57] ABSTRACT

A method of processing a frozen pizza food product and a machine for performing the process. The pizza is cut into a plurality of sections while it is frozen and its temperature lowered to 20° to 24° F. A plurality of cutting knives on a cutting head cyclically cut the frozen pizzas into pie-shaped segments. The individual pizza segments are kicked out radially into a tray below the cutting die as each pizza is segmented. The machine then crimps a cover onto the tray and ejects the tray.

13 Claims, 13 Drawing Figures

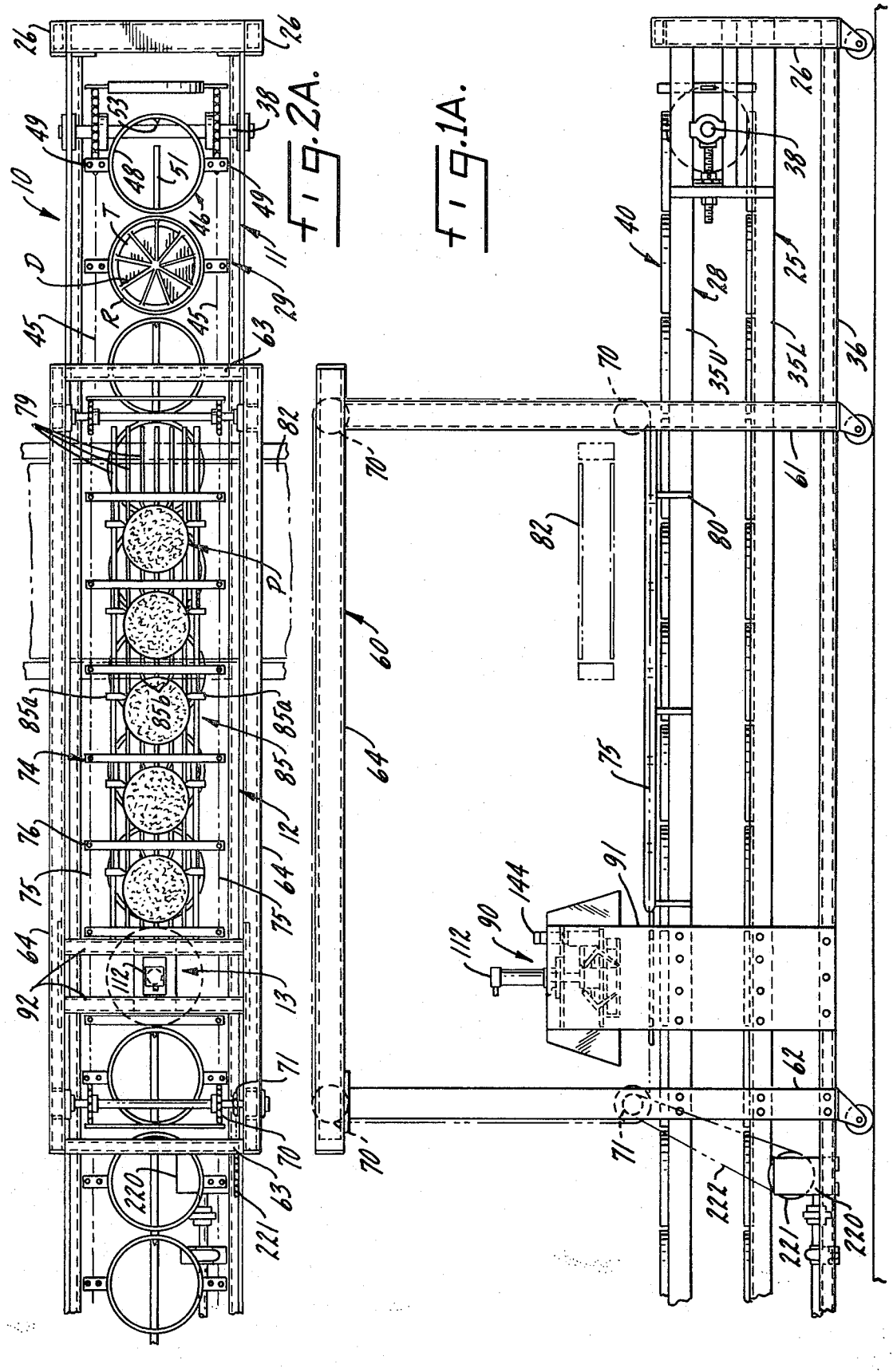

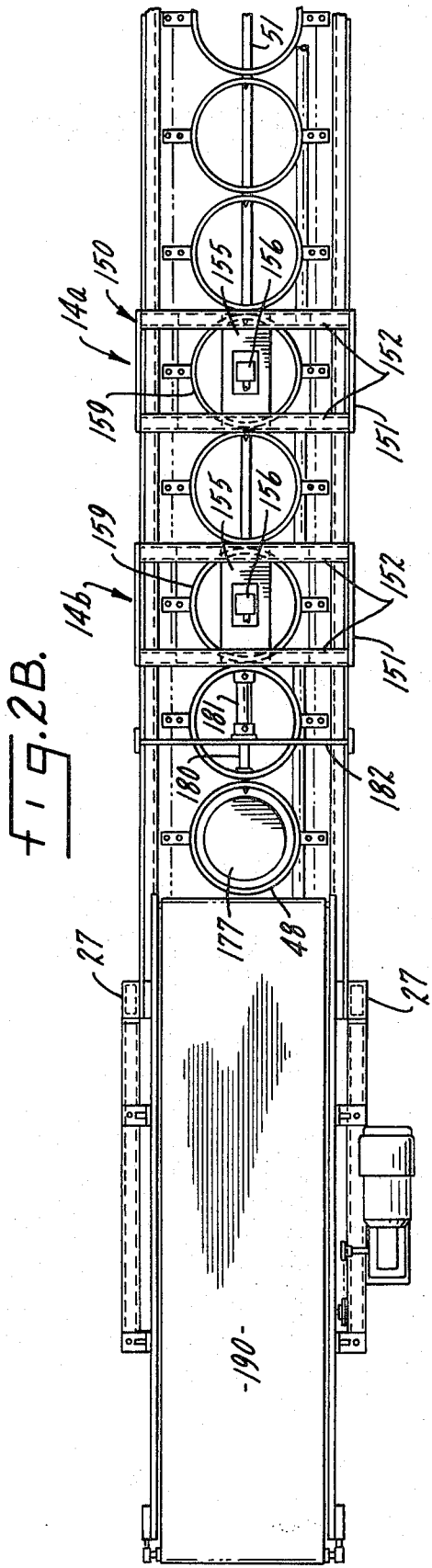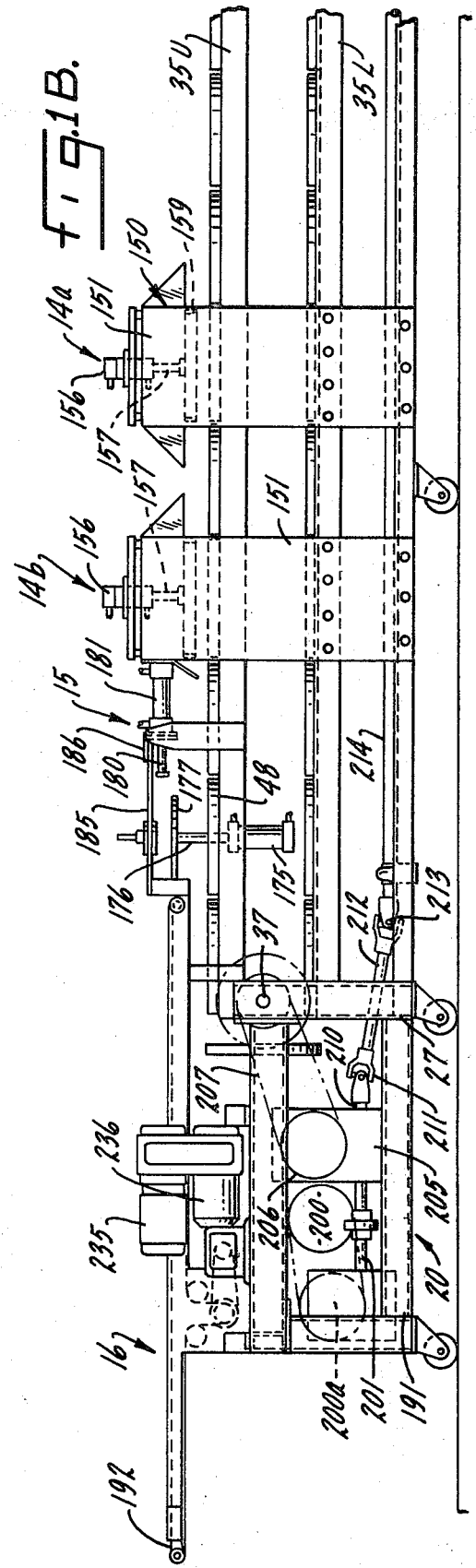

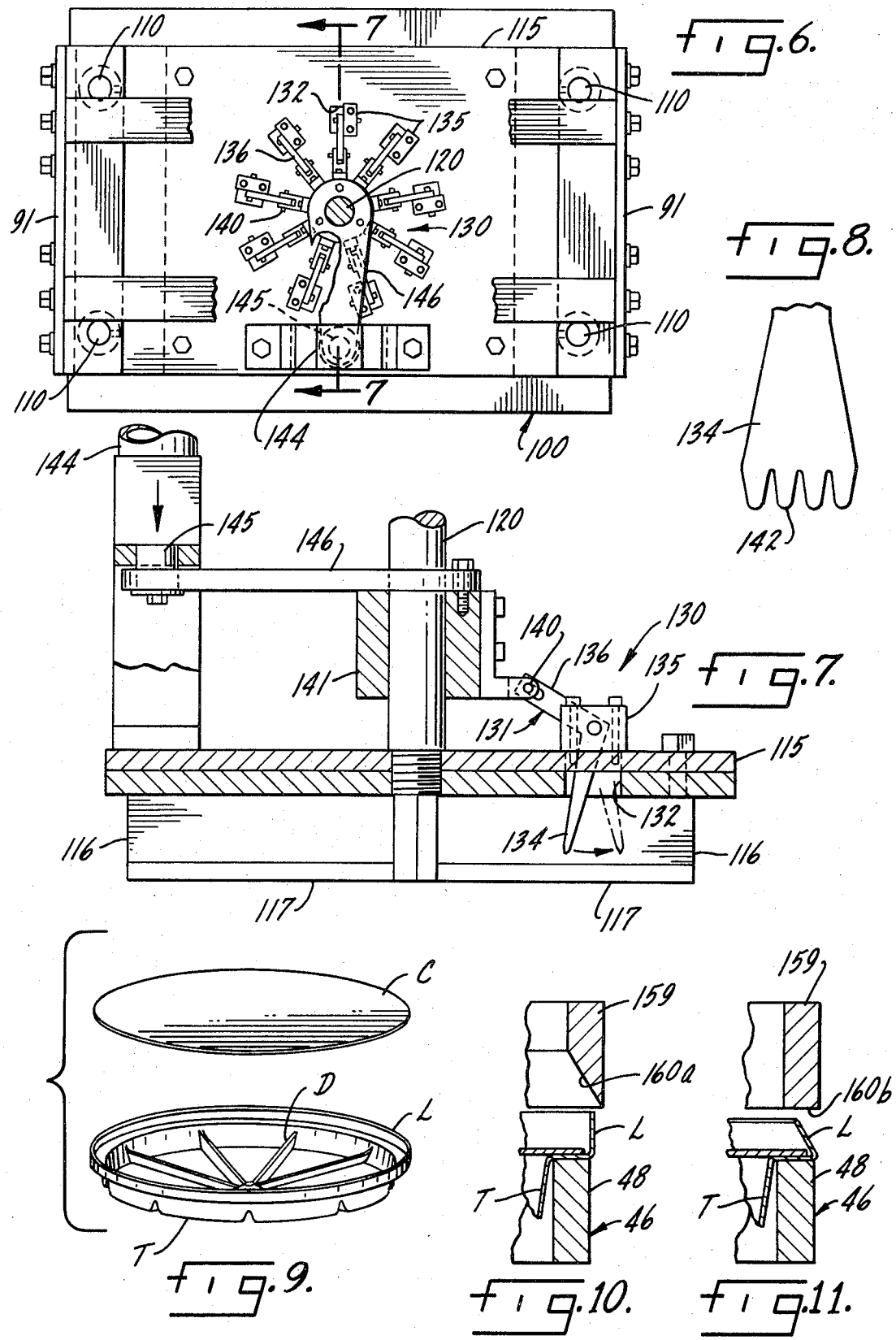

PIZZA PROCESSING MACHINE

BACKGROUND OF THE INVENTION

This invention relates in general to a method of processing a frozen pizza food product and a machine for processing frozen pizza. It deals more particularly with a method for cutting frozen pizza into pie-shaped segments, introducing the pie-shaped segments to a partitioned tray, and covering and ejecting the tray. It also deals with a machine for practicing the method.

It is a common practice to market individual pizzas, or pizza pies, in frozen, uncooked form. The purchaser can store the pizza in a home freezing compartment until he or she wishes to serve it. At this time, the entire pizza is conventionally placed in an oven at a predetermined temperature and baked for a prescribed length of time. Upon removal, it must be cut or broken into pieces for individual servings.

With conventional frozen pizzas presently being marketed, it is necessary to bake the entire pizza at one time, this is true even though the purchaser might want to serve only a small portion of it. Although it is conceivable that a conventional frozen pizza could be broken into small pieces before baking, the fact that the dough, cheese, sausage, etc., are frozen solid would make such a process difficult and messy, at the least.

SUMMARY OF THE INVENTION

It is an object of the present invention to provide a method of processing frozen pizza to separate it into individual, pie-shaped segments and package it. It is another object to provide a machine which cuts the frozen pizza into a plurality of sections, deposits the sections in a suitably partitioned tray, fastens the cover on the tray, and ejects the tray for packing.

The foregoing and other objects are realized in accord with the invention by providing a machine which receives a conventional, frozen pizza in its completely prepared form; i.e., the dough has been rolled and cut into circular configuration, and cheese (with, in some cases, various other foodstuffs such as sausage, pepperoni, etc.) has been applied to its upper surface. The frozen pizza is delivered to the machine from a freezing process or storage area at a temperature of 20° to 24° F. The machine moves the pizza from a receiving station to a cutting station in intermittent steps.

At the same time, suitably partitioned trays are introduced to the machine at a separate receiving station. The machine moves the trays in circular flight carriers, in corresponding intermittent steps, from the receiving station to a position in vertical alignment below a cutting head.

At the cutting station, frozen pizza is cut by radially disposed cutting knives into nine pie-shaped segments. As the knives complete their cutting motion through the frozen pizza each individual pie-shaped segment of frozen pizza is "kicked" radially outward as it begins to drop through a corresponding aperture in the cutting die. The outward and downward movement of the individual, pie-shaped segments carries them into corresponding cavities of the partitioned tray.

The machine then moves the tray carrying the segmented pizza out of the cutting station, to and through cover fastening stations where a cover is affixed to the tray. Once the cover has been secured, the tray, in continuing intermittent steps, moves to an ejection station where it is automatically ejected onto a take-away conveyor.

BRIEF DESCRIPTION OF THE DRAWINGS

The invention, together with its construction, arrangement and method of operation, including additional objects and advantages thereof, is illustrated more or less diagrammatically in the drawings, in which:

FIGS. 1A and 1B are, collectively, a side elevational view of the pizza processing machine embodying features of the present invention;

FIGS. 2A and 2B are, collectively, a top plan view of the pizza processing machine;

FIG. 6 is a top plan view of the cutting unit, shown in FIG. 5, with parts removed;

FIG. 7 is a sectional view taken along line 7—7 of FIG. 6;

FIG. 8 is an enlarged front elevational view of a pizza kicker leg illustrated in FIG. 7;

FIG. 9 is an exploded view of a multi-cavity pizza tray and cover;

FIG. 10 is an enlarged sectional view through the tray closing unit of the machine, immediately prior to the closing operation; and FIG. 11 is an enlarged sectional view through the closing unit of the machine, during the closing operation.

DESCRIPTION OF THE PREFERRED EMBODIMENT

Figure 3:
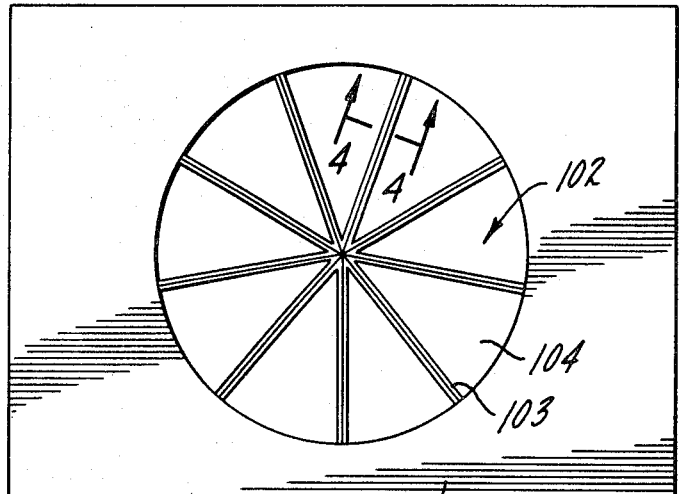
FIG. 3 is a top plan view of a die plate for the machine.

Referring to FIGS. 1A, 1B, 2A and 2B, a machine for cutting frozen pizza and packaging it according to the method of the invention is illustrated generally at 10. The machine 10 includes a tray (and segmented pizza) conveyor unit 11 which has associated with it, in order of their operation, an uncut pizza conveyor unit 12, a pizza cutting and depositing unit 13, tray closing units 14a and 14b, a closed tray ejector unit 15, and a take-away conveyor unit 16. Motive force and control for operating the various units comprising the machine 10 is provided by a control and power train 20.

The tray (and segmented pizza) conveyor unit 11 comprises an elongated table 25 having a pair of castered legs 26 at its receiving end and a corresponding pair of castered legs 27 at its discharge end. The legs 26 and 27 support a horizontally disposed conveyor bed 28. The conveyor bed 28 mounts a conveyor assembly 29 which is driven by the control and power train 20 in a manner hereinafter discussed.

The bed 28 comprises upper side rails 35U and lower side rails 35L, all fabricated of sheet stainless steel. At this point, it might be explained that the machine 10 is fabricated to a great extent of stainless steel since it is a food-handling machine. In addition to the side rails 35U and 35L, the legs 26 and 27 are also joined by side rails 36.

Journalled between the castered legs 27, immediately below the upper rails 35U, is a drive sprocket subassembly 37. In turn, journalled in a conventional manner between the rails 35U and 35L, immediately adjacent the castered legs 26, is a driven sprocket sub-assembly 38. A tray conveyor sub-assembly 40 embodying features of the invention is entrained around the drive sprocket sub-assembly 37 and the driven sprocket sub-assembly 38 and extends between them.

The conveyor sub-assembly 40 comprises a pair of conventional conveyor link chains disposed adjacent opposite side rails 35U, 35L of the bed 28 and extending longitudinally of the bed. Mounted between the chains 45 at evenly spaced intervals along its entire length, are 58 tray carrying "flights" 46 spaced at 14 inch intervals. Each tray carrying flight 46 includes a flight carrier ring 48 having an inside diameter of 12 7/8 inches and fastened at its opposite sides to corresponding chains through chain-link slats 49 of suitable construction.

The upper, or carrying reach of the conveyor sub-assembly 40, moves in a direction from right to left as seen in FIGS. 1A, 1B, 2A and 2B, between the upper rails 35U of the bed 28. In turn, the return reach of the conveyor sub-assembly 40 moves from left to right between the lower rails 35L. Along its carrying reach, the conveyor sub-assembly 40 is supported by a carrier bar 51 extending longitudinally of the bed 28, suitably supported between the upper rails 35U.

A flight 46, entering the carrying reach, is moved in steps, intermittently, toward the take-away conveyor unit 16, by a control and power train 20, in a manner hereinafter discussed in detail. For the moment, suffice it to say that the 12 7/8 inch rings 46 are indexed toward and through the pizza cutting and depositing unit 13 at a rate of 35 feet per minute, in 14 inch increments with a two-second delay between intermittent steps. In doing so, each ring 46 carries a tray T, which is deposited in the ring adjacent the driven sprocket sub-assembly 38, as the ring comes onto the carrying reach of the conveyor sub-assembly 40. The trays T are inserted into cavities formed by the rings, with the tray rims R overlying the rings, and one of the tray partitions P centered on the longitudinal centerline of the conveyor by an orientating lug 53.

At the same time that the conveyor sub-assembly 40 is moving trays T along the carrying reach in the aforedescribed manner, the uncut pizza conveyor unit 12 is moving a succession of frozen, uncut, 11 inch pizza pies from a receiving station toward and through the pizza cutting unit 14. The conveyor unit 12 comprises an upright frame 60 which is generally rectangular in configuration and includes a pair of castered legs 61 at one end and another pair of castered legs 62 at the opposite end. The legs 61 and 62 of each pair of legs bracket the rails 35U, 35L and 36 and are bolted thereto in a suitable manner. The legs 61 and 62 are joined together at corresponding upper ends by identical cross-frame members 63. Longitudinally extending stringers 64, in turn, join the upper ends of each pair of upstanding legs 61, 62.

Trained around three driven sprocket sub-assemblies 70, two of them journalled in the upper corners of the frame 60 and a third intermediate the ends of the upstanding legs 61 immediately above the carrying reach of the conveyor 40, respectively, and a drive sprocket sub-assembly 71 journalled between the upstanding legs 62 immediately above the carrying reach, is an uncut pizza conveyor sub-assembly 74. The conveyor sub-assembly 74 includes a pair of link chains 75 journalled around the sprocket sub-assemblies 70, 71 and driven by the control and power train 20 in a manner hereinafter discussed. Extending between the drive chains 75 and fastened thereto, are 29 flight bars 76, spaced on 13 inch centers.

In the conveyor sub-assembly 60, the carrying reach stretches between the lowermost driven sprocket sub-assembly 70 and the drive sprocket sub-assembly 71, over a longitudinally extending series of support rails 79. These support rails 79, of which there are seven in number, are mounted immediately above the carrying reach of the tray conveyor sub-assembly 40 by suitable support brackets 80 fastened to the sides of the upper rails 35U in the bed 28. The control and power train 20 indexes the conveyor 60, in intermittent steps, in a clockwise direction as illustrated in FIGS. 1A and 1B. As the conveyor 60 moves in this manner, frozen 11 inch pizzas are deposited from a delivery conveyor 82, in front of each flight bar 76 as it begins its travel over the rails 79 after coming around the lower driven sprocket sub-assembly 70.

Each frozen 11 inch pizza is precisely centered between the flight bars 74 and relative to the conveyor chains 75 by centering fingers 85 extending horizontally forward from each flight bar and fastened thereto in a suitable manner. The outer fingers 85a are relatively long and bent inwardly to engage the trailing edge of the frozen pizza resting between the corresponding flight bars at points displaced on its circumference approximately 120°, while the two shorter fingers 85b engage the trailing edge of the frozen pizza approximately 30° apart.

The pizza slides along the rails 79, pushed by the flight bars 74 and corresponding fingers 85, in intermittent movement, at a rate of 32 1/2 feet per minute, with a two-second delay between movement steps. The control and power train 20 brings trays on the tray conveyor 40 sub-assembly and frozen pizzas on the pizza conveyor sub-assembly 60 coincidentally into operative relationship with the pizza cutting and depositing unit 13.

The unit 13 comprises an upright, box-like housing 90 which is supported by the bed rails 35U and 35L and the lower rail 36 of the frame 25 for the conveyor unit 11. The housing 90 includes side panels 91 which are bolted to the aforementioned rails in a conventional manner and extend above it. Transversely extending roof beams 92 interconnect the upper ends of the side panels 90.

Mounted between the side panels 91, coextensive with the end of the support rails 79, is a female die member 100. The female die member 100 comprises a plate 101 which is seated in a suitable manner, at its opposite ends, on the side panels 91. The plate 101 has machined therein a female die pattern 102 comprising a radiating series of spokes 103 forming nine pie-shaped openings 104.

Figure 4:
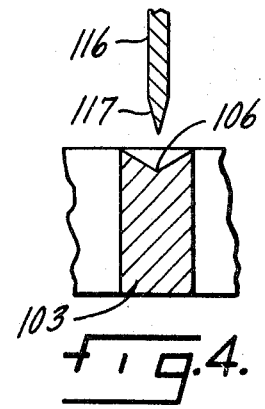
FIG. 4 is a sectional view taken along line 4—4 of FIG. 3, with a cutting knife in position above the die plate.
Figure 5:
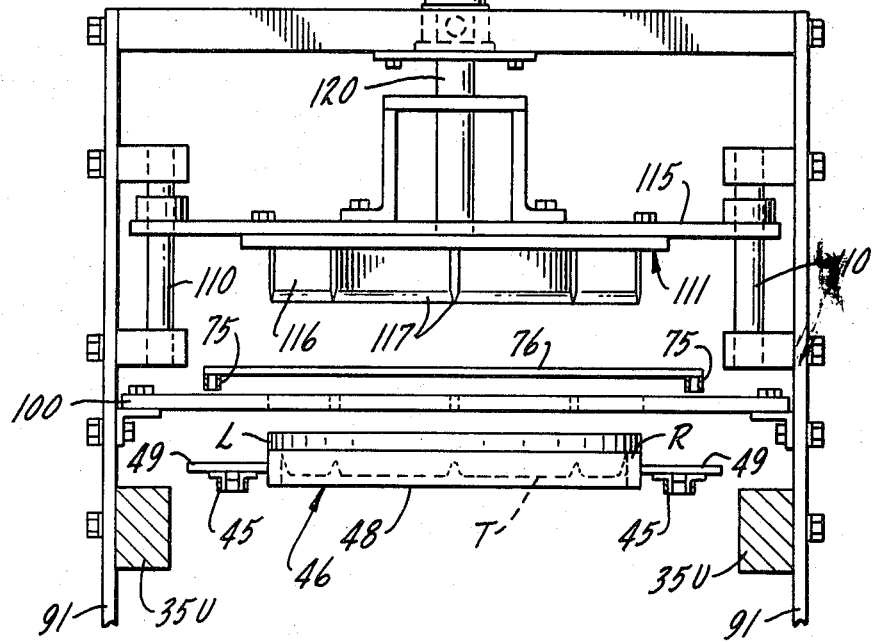
FIG. 5 is an enlarged, and elevational view of the pizza cutting unit of the machine, with parts removed.

Each of the radiating spokes 103 is hollow ground on its upper surface, as seen at 106 in FIG. 4. The spokes 103 meet at a common center and are unitary with each other there. At their outer ends, they are unitary with the plate 101 itself.

Extending upwardly from the plate 101 adjacent its four corners are four bearing shafts 110 which are rigidly fastened at their upper ends to the side panels 91. Mounted in vertical sliding movement on the shafts 110 is a male die assembly 111. The male die assembly 111 is moved down and up in a cyclical die cutting operation by a conventional, piston-type fluid motor 112 mounted for vertical operation on the transversely extending roof beams 92 of the housing 90.

The die head 111 comprises a die plate 115 which has bearing sleeves suitably mounted in its four corners and slideable on the bearing shafts 110. Nine radially oriented cutting knives 116 are mounted in evenly spaced relationship on the bottom of the die plate 115. The nine depending cutting knives 116 have radially extending cutting edges 117 which are adapted to mate precisely with the corresponding radially disposed female die spokes 103 in the die plate 101.

The conveyor unit 40 moves a tray T into position immediately beneath the female die plate 101 at precisely the same moment that a frozen pizza is moved by the conveyor sub-assembly 60 into position on the die plate 101. The fingers 85a and 85b position the frozen pizza P precisely in the center of the plate 101, so that the entire pizza lies within the periphery of the openings 104. Immediately upon the tray T and the frozen pizza P stopping in the aforedescribed position, the control and power train 20 is effective in a manner hereinafter described to actuate the fluid motor 112 and, through its actuator piston 120 which is fastened to the center of the die plate 115, drive the die plate downwardly to cut the frozen pizza P into nine segments.

The travel of the piston 120 is so calculated that the cutting edge 117 of each cutting knife 116 passes completely through the frozen pizza and partially into the hollow ground groove 106 in the top of a corresponding spoke 103. However, at full travel the cutting edge 117 still does not bottom in the hollow ground groove 106. This is to assure that the knife edges 117 do not become dulled.

The pie-shaped segments of pizza P tend to fall through the openings 104 in the die plate 101 once they are cut through. However, if permitted to fall straight down they would not come to rest properly in corresponding tray T cavities because the tray cavities are radially displaced approximately three-quarters (3/4) of an inch from the center point of the tray itself due to the center stiffening cone which forms the central juncture point of the divider partitions in the tray. Accordingly, the cutting and depositing unit 13 is effective to "kick" the individual pie-shaped segments of frozen pizza radially outwardly as they drop through the openings 104 to the extent that the segments fall precisely into corresponding tray cavities.

Referring specifically to FIGS. 6 and 7, a pizza segment "kicker" sub-assembly 130 is provided on the die head plate 115 for performing this function. Sub-assembly 130 comprises nine inverted L-shaped kicker arms 131 evenly spaced around the piston shaft 120 and extending through radially elongated apertures 132 formed through the plate 115. The depending leg 134 of each kicker arm 131 is pivotally mounted in a conventional manner on a bearing block 135 secured to the upper surface of the plate 115. The foot 136 of each kicker arm 131 extends radially inwardly toward the shaft 120 above the plate 115.

The innermost end of each foot 136 on a kicker arm 131 is pivotally connected, in lost-motion relationship at 140, to an actuator ring 141 encircling the shaft 120. By moving the ring 141 downwardly relative to the shaft 120 the kicker arms 131 are all forced to pivot around their pivot point 140 so that their depending legs 134 move radially outwardly toward the dotted line position illustrated in FIG. 7. In this outward motion, the fork-like fingers 142 on the lower end of each kicker arm leg 134 engages the upper surface of a frozen pizza segment just as the die knives 116 complete their cut through the pizza P and "kick the individual pizza segments radially outwardly as they fall.

The ring 141 is moved downwardly in the afore-described manner by a piston-type fluid motor 144 of conventional construction mounted in upright relationship on the upper surface of the die plate 115, adjacent its periphery. Extending transversely from the lower end of the motor piston 145, and rigidly secured to it, is an actuator plate 146. The actuator plate 146 is, in turn, radially fixed to the periphery of the ring 141.

The motor 144 is actuated, in a manner hereinafter discussed, when the cutting knives 115 have penetrated the frozen pizza to a point not quite through it, and the kicker legs 134 begin to move radially outwardly. As the cutting operation of the knives 116 is completed, the kicker legs 134 have moved full travel to their radially outermost position, as seen in dotted lines in FIG. 7. The pie-shaped segments of frozen pizza were kicked outwardly as they fall through the die plate apertures 102 into the tray cavities. The motor 144 then retracts the piston 145. Retraction of the piston 145 draws the actuator ring 141 upwardly, pivoting the kicker arms 131 about their pivot points 132 and retracting them to the solid line position.

The frozen pizza has been sliced into nine segments and the individual slices kicked out radially to drop into receiving cavities in the tray T immediately below, all in the span of the two-second delay between intermittent step movement of both the tray conveyor sub-assembly 40 and the frozen, unsliced pizza conveyor sub-assembly 60. The tray T under the pizza slicing and depositing unit 13, having received its slices of pizza, continues to move on in intermittent steps toward the tray closing units 14a and 14b. Before it reaches the first of these units 14a, however, a circular cardboard cover C is placed on top of the tray within the confines of an upstanding lip L. In this relationship, loosely covered by the circular cover C, the tray T moves into the closing unit 14a.

The closing unit 14a comprises an upright, box-like housing 150 supported by the rails 35U and 35L, as well as the lower rail 36. The housing 150 includes side walls 151 fastened to the lower rail 36 and the rail 35L of the conveyor bed 28 in a suitable fashion and extending above the level of the carrying reach of the conveyor sub-assembly 40. Joining the side walls 151 over the top of the carrying reach of the conveyor sub-assembly 40 are transversely extending roof beams 152.

The roof beams 152 carry a centrally disposed roof plate 155 upon which is mounted a conventional piston-type fluid motor 156. The piston 157 of the fluid motor 156 extends through the roof plate 155 and carries a crimping ring 159 on its lower end.

As seen in FIG. 10, the crimping ring 159 is slightly larger in diameter than the rings 46 of the conveyor sub-assembly 40. The lower surface 160a of the ring 159 is, however, beveled upwardly and inwardly at an angle of 60°. As a result, when the motor 156 drives the piston 157 and, accordingly, the ring 159 downwardly to engage the upstanding lip L on the rim R of the tray T, the beveled surface 160a contacts this upstanding lip and crimps it inwardly at an angle of 60° to the horizontal. The motor 156 is operated by the control and power train 20 in a manner hereinafter discussed in detail.

The aforedescribed preliminary crimping takes place, of course, in a three-second interval during which the conveyor 40 stops between intermittent steps. The partially crimped tray then moves on, in intermittent steps, to the final closing unit 14b.

The unit 14b is identical to the unit 14a, with but one exception. Accordingly, corresponding reference numerals are applied to corresponding components. The one construction modification of the unit 14b is that the lower surface of the ring 159 is not beveled upwardly, as at 160a in the crimping unit 14a, but is flat, as at 160b in the crimping unit 14b. Accordingly, when the ring 159 of the crimping unit 14b is forced downwardly by its motor 156, the flat lower surface 160b of the ring 159 crimps the partially inwardly bent lip L of the tray T downwardly flat onto the cover C, thus closing the tray T with the cover held tightly over it.

After two more intermittent steps of the conveyor 40, with the closed tray T on it, the tray involved has reached the ejector unit 15. While in its two-second "hold" with the tray over the ejector unit, as illustrated in FIG. 1B, the fluid motor 175 is operated by the control and power train 20 to move its piston 176, carrying an ejector plate 177, upwardly through the corresponding ring 48. The ejector plate 177 lifts the tray T up level with the take-away conveyor unit 16, at which time the horizontally operating ejector piston 180 extending from a fluid motor 181 mounted on suitable bracketing 182 affixed to the upper rail 35U is actuated.

Actuation of the motor 181, also by the control and power train 20 in a manner hereinafter discussed, forces the filled and closed tray T off of the plate 177 onto the take-away unit 16. To prevent the operation of the motor 175 and the upwardly moving plate 177 from knocking the filled tray off the plate, a plastic roof 185 is mounted over the plate, at a spacing from the plate (at full travel) slightly greater than the thickness of the tray T. The plastic roof 185 is mounted on the rails 35U through suitable brackets 186 and may be lifted upwardly to provide access to the plate 177.

The pan take-away conveyor unit 16 comprises a conventional wire-mesh conveyor sub-assembly 190 mounted on top of a frame 191 which supports the power pack of the control and power train 20. It is a constantly moving mesh conveyor which is conventional in all repsects and requires no further description. At the free end 192 of this conveyor, the packaged, sliced pizza in the trays T covered as described, are removed for packing and shipment.

The control and power train 20, which provides the motive force and control (including timing) for the conveyor sub-assemblies 40 and 60, and the fluid motors 112, 144, 156, 175 and 181, comprises a two horsepower electric motor 200. The motor 200 drives a conventional speed reducer 200a through a drive belt. The output shaft 201 of the speed reducer 200a drives a conventional Ferguson indexer 205.

The indexer 205 intermittently rotates an output sprocket 206 at a predetermined speed, with two-second delays between the intermittent rotation. Its drive chain 207 turns the drive pulley 37 of the conveyor sub-assembly 40 and the conveyor sub-assembly 40 moves in the manner hereinbefore described.

The indexer 205 also has an auxiliary constant speed output shaft 210 which is connected through universal joint 211, connecting shaft 212, universal joint 213, and drive shaft 214 to another conventional Ferguson indexer 220. The indexer 220 intermiytently rotates its output sprocket 221 at a predetermined speed. Its drive chain 222 turns the drive pulley 71 of the conveyor sub-assembly 60 in the manner hereinbefore described.

A separate 35 horsepower motor, pump and fluid reservoir unit (not shown) provides fluid under pressure through a solenoid valve complex to the fluid motors 112, 144, 156, 175 and 181. Cam actuated electrical relays on the conveyor sub-assembly 60, in the case of the fluid motor 112, and on the conveyor sub-assembly 40 in the case of the fluid motors 156, 175 and 181, actuate the valves of the valve complex 226 in a prescribed sequence to operate these motors in the manners hereinbefore described. A separate limit-travel relay on the die head 111 is effective to actuate the solenoid valve for the fluid motor 144 which operates the kicker fingers 131.

The conveyor sub-assembly 190 is powered by a two horsepower electric motor 235. The motor 235 drives a variable speed transmission 236 which, in turn, drives the conveyor sub-assembly 190 at selected speeds consistent with the proper handling of the closed trays as they are removed from the machine 10.

While the embodiment described herein is at present considered to be preferred, it is understood that various modifications and improvements may be made therein.

What is desired to be claimed and secured by Letters Patent of the United States is:

1. A machine for cutting frozen pizzas into segments and packaging the segments of each pizza in a partitioned tray, comprising:
   a. first conveyor means adapted to receive and carry a partitioned tray,
   b. second conveyor means adapted to receive and carry a frozen, uncut pizza,
   c. said conveyor means adapted to move a frozen, uncut pizza and a partitioned tray simultaneously into positions in pizza cutting means wherein the tray is immediately below the uncut pizza,
   d. said pizza cutting means including a male die head having radial knives and a female die member with said die head positioned vertically over said die member and adapted to move vertically upwardly and downwardly relative to said die member,
   e. said knives adapted to cut a frozen pizza into segments while the pizza is supported by said die member whereby pizza segments fall downwardly through said die member into predetermined cavities of the tray.

2. The machine of claim 1 further characterized in that:
   a. said die head includes kicker means for kicking pizza segments radially outwardly as they are cut so they fall outwardly and downwardly into the cavities of the partitioned tray.

3. The machine of claim 1 further characterized by and including:
   a. means for fastening a cover on each tray after the pizza segments have been deposited in its cavities.

4. The machine of claim 1 further characterized in that:

a. said female die member comprises a plate having a plurality of radially arranged openings extending vertically therethrough and defining a radiating series of spokes,
b. said spokes adapted to support the frozen pizza while said radial knives cut it into pizza segments.

5. The machine of claim 4 further characterized in that:
a. each of said radiating spokes is hollow-ground on its upper surface,
b. said die head being mounted above said die member for vertical travel whereby at the lowermost position of the die head cutting edges on said knives extend into corresponding hollow-ground grooves.

6. The machine of claim 5 further characterized in that:
a. at said lowermost position of travel of said die head said cutting edges extend into corresponding hollow-ground grooves without engaging the bottoms in said grooves.

7. The machine of claim 4 further characterized in that:
a. said die head includes kicker means for kicking pizz segments radially outwardly as they are cut so they fall outwardly and downardly through said radial openings into the cavities of the partitioned tray.

8. The machine of claim 7 further characterized in that:
a. said kicker means includes a radially arranged series of kicker arms pivotally mounted on a die head plate,
b. means for pivoting said kicker arms radially outwardly so that depending feet on said kicker arms engage pieces of pizza as they are cut and urge them radially outwardly as they fall downwardly through said radial openings.

9. The machine of claim 3 further characterized by and including:
a. said means for fastening a cover on each tray comprises a first annular ring lying substantially in a horizontal plane and adapted to move vertically relative to said first conveyor means over said conveyor means,
b. said first ring having a lower surface adapted to engage a vertically extending, annular lip formed on the tray and encircling the cover,
c. said surface being substantially frusto-conical in configuration.

10. The machine of claim 9 further characterized in that:
a. said frusto-conical surface is inclined to the horizontal at an angle of approximately 60-degrees.

11. The machine of claim 9 further characterized in that:
a. said means for fastening a cover on each tray further comprises a second annular ring vertically movable relative to said fist conveyor means over said first conveyor means,
b. said second annular ring having a lower surface thereon which lies substantially in a horizontal plane and is adapted to flatten the lip of the tray over the cover after the first ring has formed the tray lip inwardly with its frusto-conical surface.

12. The machine of claim 3 further characterized by and including:
a. means for lifting a tray upwardly off said first conveyor means and then horizontally to tray removal means after it has been filled with pizza segments and a cover fastened to it.

13. The machine of claim 1 further characterized in that:
a. said first conveyor means is endless and travels in one of a clockwise or counterclockwise direction,
b. said second conveyor means is also endless and travels in the other of said clockwise or counterclockwise directions.

* * * * *